Jan. 19, 1965  B. FARMEN  3,165,977
MACHINE TOOL WITH AN ANGULARLY ADJUSTABLE SPINDLE HEAD
Filed Dec. 12, 1961  2 Sheets-Sheet 1
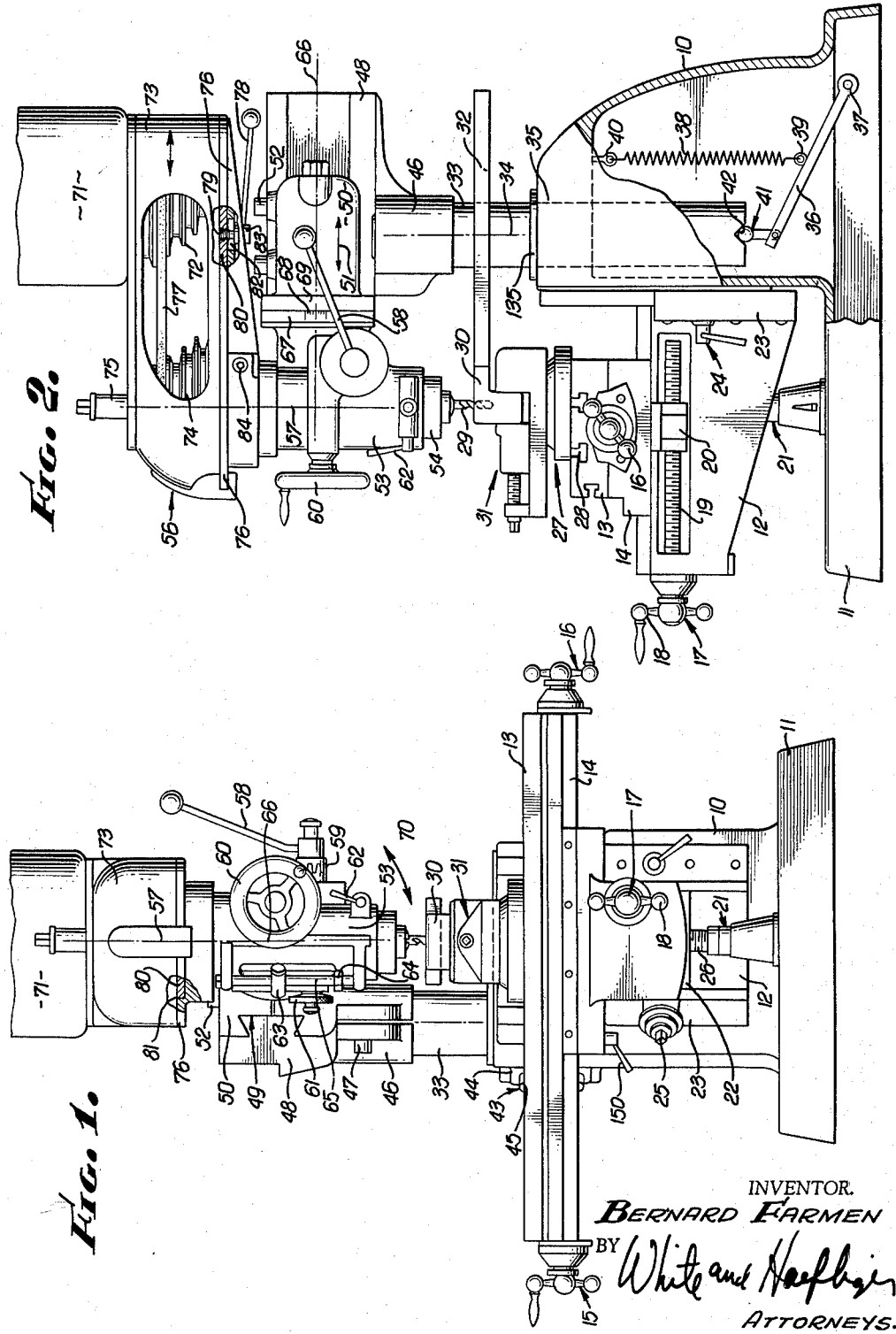
INVENTOR.
BERNARD FARMEN
BY White and Haefliger
ATTORNEYS.

Jan. 19, 1965  B. FARMEN  3,165,977
MACHINE TOOL WITH AN ANGULARLY ADJUSTABLE SPINDLE HEAD
Filed Dec. 12, 1961  2 Sheets-Sheet 2
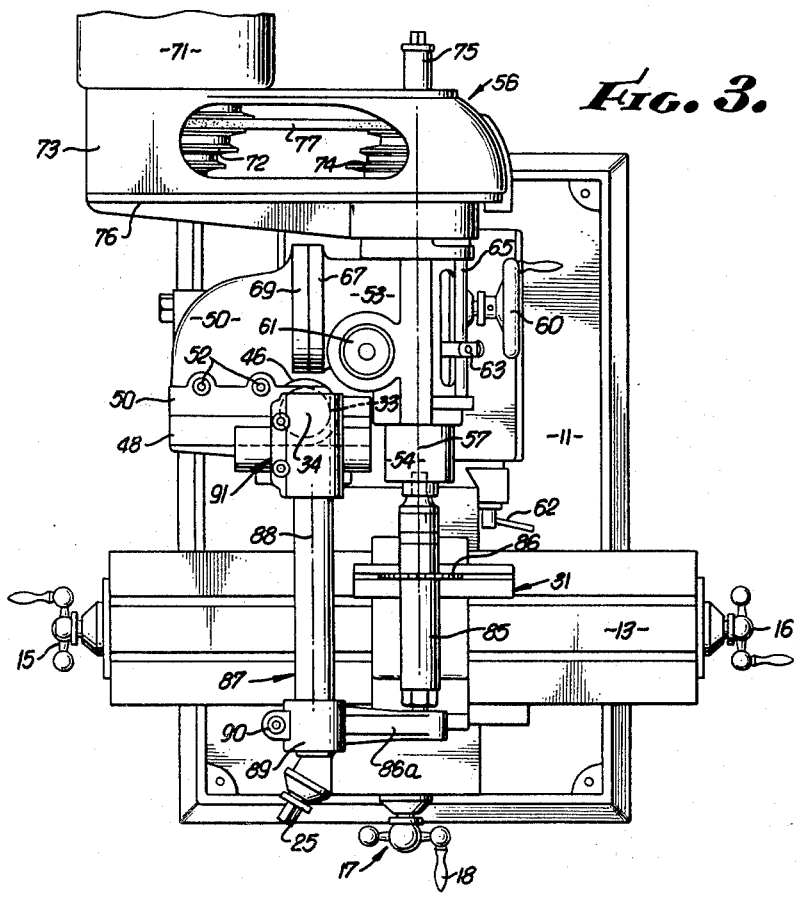
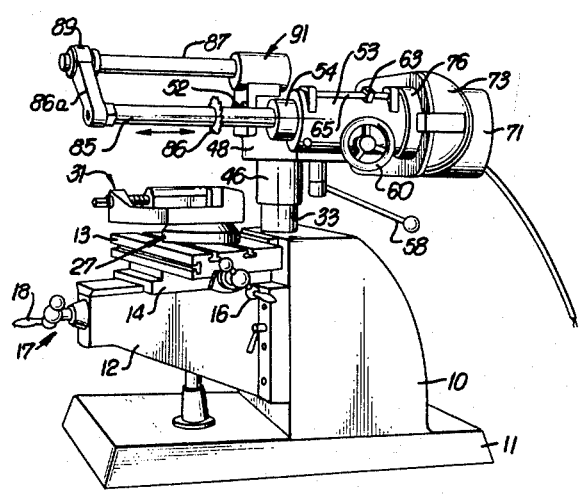
INVENTOR.
BERNARD FARMEN
BY
ATTORNEYS.

United States Patent Office 3,165,977
Patented Jan. 19, 1965

3,165,977
MACHINE TOOL WITH AN ANGULARLY
ADJUSTABLE SPINDLE HEAD
Bernard Farmen, 3323 Lime Ave., Long Beach 7, Calif.
Filed Dec. 12, 1961, Ser. No. 158,738
4 Claims. (Cl. 90—17)

This invention relates generally to machine tools of the milling and drilling type, and more particularly concerns what may be characterized as a novel universal machine having swiveling and other features giving the machine a versatility previously unknown. In the past milling machines have suffered from inability to center work for cutting operations of different types where the work extends rearwardly to considerable extent, since the machine column supporting the cutting head structure has previously been positioned to the rear center of the work table. The column has been so located in order to enable the head structure to perform the various desired cutting operations, and generally speaking it has not been thought possible to achieve the desired cutting without supporting the structure on such a column.

The present invention now makes it possible to center the work beneath the cutting head structure where the work extends rearwardly to considerable extent, all without interference from any column supporting the head structure, and furthermore makes possible the swiveling of the head structure in a novel manner to achieve two basic cutting configurations of the head structure as well as others as will become clear from the following description.

More particularly, the invention contemplates the provision of means including swivel apparatus and a post extending axially vertically at the rear of the table for carrying the speed head structure to swivel about a horizontal axis and the post vertical axis. The swivel apparatus and post are characterized in that the speed head has a first position in which the rotary quill of the head extends vertically above the table and a second position in which the quill after rotation about said horizontal and vertical axes extends horizontally from front to rear with respect to the machine table. In addition a frontwardly and rearwardly oriented vertical plane through the quill axis in each of the mentioned positions is centered with respect to table center and sidewardly offset with respect to the post so that work centered on the table beneath the quill may project rearwardly without interfering with the post.

Other objects of the invention include the provision of a vertically movable post together with means for locking the latter in selected vertical position and means exerting upward loading on the post to counterbalance the weight of the speed head and post. The speed head carried by the post also makes provision for swiveling of the quill drive motor about the quill axis, as well as adjustment shifting of the motor axis with respect to the quill axis to permit changing of the drive belt position on driving and driven step pulleys. In this regard, the quill drive is so located as to be capable of swinging about the previously mentioned horizontal and vertical axes without interfering with other head structure, all as will become clear from the description. As a result, the speed head may be shifted between its different cutting positions without requiring assembly or disassembly of machine parts.

These and other objects and advantages of the invention, as well as the details of an illustrative embodiment, will be more fully understood from the following detailed description of the drawings, in which:

FIG. 1 is a front elevation of the complete machine;
FIG. 2 is a side elevation of the machine shown in FIG. 1;
FIG. 3 is a plan view of the machine wherein the speed head has been shifted to what may be characterized as second position and overarm structure has been added to support the quill; and
FIG. 4 is a perspective elevation showing the machine with the speed head in second position.

Referring first to FIGS. 1 and 2, the machine may be described as comprising a base 10 on a bed 11 with a knee 12 projecting forwardly from the base. The knee carries a table 13 supported for transverse movement on a table bed 14 under the control of table screw feed controls 15 and 16. A table lock lever is shown at 150. The bed 14 is in turn movable in and out, or frontwardly and rearwardly by a cross feed control 17 including a handle 18, a screw 19 and a follower nut 20 engaged by the screw and depending from the bed 14. In addition, the knee 12 may be lifted and lowered by a jack shown at 21, the rearward terminal 22 of the knee sliding vertically in a guide 23. A lock 24 is provided for clamping the knee in selected vertical position, and a rotary control 25 cooperates with the jack threads 26 to lift and lower the knee.

Mounted on the table 13 is a work holder generally shown at 27, the usual tongue and groove connection between the holder and the table being shown at 28. The latter connection allows the holder to be shifted lengthwise transversely along the table so as to center the work beneath the rotary tool such as a drill shown at 29. The work 30 is typically clamped by appropriate tool holder mechanism illustrated at 31. Furthermore, the work 30 projects rearwardly at 32 to considerable extent without interference with a post 33 carrying machine structure to be described.

The post is journaled for rotation about a vertical axis 34 in the base 10 at the location 35, and carries a full length zero line to be oriented with respect to collar graduations 135. It is also vertically movable to lift and lower the structure supported by the post with respect to the work. Such vertical movement is often desired such as for example where the height of the work requires lifting of the tool 29 and to facilitate such adjustment the post is counterbalanced. One example of so counterbalancing the post is shown in FIG. 2 to include a lever 36 pivoted at 37 to swing within a vertical plane in the hollow base 10. A tension spring 38 is connected at 39 to the lever and at 40 to the base structure so as to exert upward force against a hinged stem structure and ball pivot 41 transmitting upward loading to the post as by interfitting of the ball in a socket 42 in the lower terminal of the post. The spring tension is selected or adjusted so as to counterbalance the weight exerted downwardly by the post and the structure carried thereby so that the operator may exert only slight upward or downward force to lift and lower the head structure and tool 29. After the post has been moved to desired vertical position and rotated about axis 34 to desired position, it may be locked with respect to the base 10 as by appropriate locking mechanism shown at 43 in FIG. 1. Typically such mechanism includes a split clamp 44 with tightening fastener 45.

The structure carried by the post is shown in FIGS. 1 and 2 to include a split collar 46 clamped on the post at 47, the collar being integral with a support or saddle 48 having dovetail tongue and groove interfit 49 with a mount 50 accommodating forward and rearward sliding of the mount with respect to the saddle as shown in FIG. 2 by the arrows 51. A suitable lock 52 is provided to lock the mount 50 to the saddle 48 when the tool 29 has been suitably positioned with respect to the work 30. In this regard, FIGS. 1 and 2 show the machine in what may be characterized as first position with the tool 29 extending vertically.

The mount 50 carries a holder 53 supporting a tool chuck 54 carried by quill 75 as well as a drive assembly 56 for the quill. As shown in FIGS. 1 and 2 the chuck and tool are driven about a vertical axis 57, and a forward and rearward vertical plane through the axis 57 is generally centered with respect to the table 13 and also is sidewardly offset with respect to the post 33, so that work centered on the table beneath the tool may project rearwardly without interference with the post. The rotating quill and tool 29 may be rapidly fed downwardly by means of the lever feed 58 in the usual manner, and that feed may be disengaged at 59 to permit rotation of the handwheel 60 which accomplishes downward feed of the tool through a worm drive or feed for fine control. An engaging lock is shown at 61, rotary loosening of the lock permitting rapid feed of the tool by the lever 58, and tightening of the rotary lock being accomplished in order to effect the worm drive as controlled by the handwheel 60. The quill 75 may be locked in any desired vertical position by the lever 62, and a depth limit 63 movable vertically with the quill is adapted to engage a stop 64 adjustably vertically positioned on the pin 65 carried by the holder 53 so as to limit vertical travel of the tool.

The holder 53 is rotatable with respect to the mount 50 about a horizontal axis 66 which intersects the vertical axis 57 as shown in FIGS. 1 and 2. Such rotation of the holder carries the tool 29 throughout an extreme arc which may extend to 360 degrees with suitable swiveling of the tool drive 56 about the axis 57. For this purpose, appropriate indexing is provided on a flange 67 on the holder at the location 68 and adjacent the lower rotary flange 69 of the mount 50. Swinging of the holder 53 about the axis 66 is indicated by the arrows 70 in FIG. 1.

FIGS. 1 and 2 also illustrate the tool drive means to include a motor 71 having a shaft with drive step pulley means 72 on the motor shaft within a casting member 73 mounting the motor. Another drive step pulley means is shown at 74 as mounted on the quill 75, the holder 53 supporting the quill for rotation and also supporting another member 76 which carries the casting 73. The carriage of the casting is such as to permit relative sliding of the members 73 and 76 to loosen or tighten the belt 77 engaging the step pulleys 72 and 74 in order to permit stepwise adjustment of the belt for variable speed drive purposes. In this regard, to accomplish loosening of the belt 77 the handle 78 is turned to turn the integral stem 79 threaded in the plate 80 of the casting 73, allowing the loosened plate to be shifted within a dovetail 81 in the member 76. The stem projects upwardly through a slot 82 in the member 76 from a tightening flange 83 attached to handle 78. Furthermore, the part 76 may be swiveled about the axis 57 after loosening of the nut 84, such swiveling rotating the drive structure 56 with respect to the holder 53.

Turning now to FIG. 3, the machine tool is shown in what may be characterized as second position wherein the quill 75 after rotation about the horizontal axis 66 and the post vertical axis 34 extends horizontally from front to rear with respect to the table. As illustrated, a vertical plane through the quill axis 57 is centered with respect to table center and sidewardly offset with respect to the post 33 to such an extent that work centered on the table and rearwardly elongated beneath the quill may project rearwardly without interfering with the post. Further, the arbor 85 coupled to the quill carries a tool 86 directly over the work holder 31, and the outer extremity of the arbor 85 is journal supported at 86 by a leg extending laterally from an overarm 87. Rotation of the leg 86 about the axis 88 of the overarm is provided for by the leg journal 89 and by the journal lock 90. Also, the overarm is suitably clamped by the structure 91 to the saddle 48. When overarm is detached, the mount 50 remains slidably supported by the saddle 48 for transverse unidirectional shifting, i.e. in a direction parallel to the lengthwise extent of the table 12. Accordingly, the tool 86 may be shifted over the work in a direction parallel to the table length, and it may also be moved in and out or frontwardly and rearwardly by the said controls 58 and 60 previously described. In the FIG. 3 configuration, the drive 56 has been rotated about the axis 57 of the quill and into the position shown. Furthermore, all of the structure carried by the post 33 may be rotated about the post by the axis 34 to carry the tool 86 in an arc about that axis and with respect to the work.

From the foregoing description it will be clear that the machine combines the functions of a vertical milling machine, a horizontal milling machine and a drill press, shifting between vertical and horizontal milling modes being made possible without assembly or disassembly of parts and the spindle or quill assuming centered condition in both vertical and horizontal positions. The speed head is used as the working unit for vertical and horizontal milling as well as drill press operations, with all angle settings available in horizontal position also being available in vertical position, and without interference between the work and the post.

I claim:
1. A machine tool, comprising a base, a work support table on the base, a speed head including a rotary quill movable above the table, said head also including a body in which the quill is journaled for driven rotation and quill drive means carried on said body for rotary adjustment about the quill axis, means including swivel apparatus and a post extending axially vertically at the rear of the table for carrying the speed head body to swivel about a horizontal axis and the post vertical axis, characterized in that the speed head has a first position in which the quill extends vertically above the table and a second position in which the quill after rotation about said axes extends horizontally from front to rear with respect to the table, a frontwardly and rearwardly oriented vertical plane through the quill axis in each of said positions being centered with respect to table center and sidewardly offset with respect to said post to such an extent that work centered on the table and rearwardly elongated beneath the quill may project rearwardly without interfering with said post, and said means including a unidirectionally adjustable slide connection carried on the post to swivel about the post vertical axis and carrying said body so that in said first position the vertical quill may be moved forwardly and rearwardly and in said second position the horizontal quill may be moved sidewardly all in response to unidirectional adjustment of said connection, said horizontal axis and said quill axis intersecting in each of said first and second positions and said horizontal axis being offset from a vertical projection of the post in each of said positions.

2. The invention as defined in claim 1 in which the post is vertically movable with respect to the base, and including means for locking the post in selected vertical position, and means exerting upward loading on the post to counterbalance the weight of said speed head and post.

3. The invention as defined in claim 1 including a cutting tool arbor coupled in driven relation with the quill in said second position so that the arbor projects horizontally frontwardly over said table, and arbor holding means supporting the terminal of the arbor and rigidly attached to said body so as to be sidewardly movable with the quill in response to unidirectional adjustment of said slide connection.

4. The invention as defined in claim 1 in which said drive means includes a motor having a shaft, drive step pulley means on the motor shaft, driven step pulley means on the quill and drive belt means coupling said drive and driven pulley means, and said speed head includes a pair of members one mounting the motor and the other mounting said one for rotary adjustment about the quill axis, said members being relatively movable in opposite directions to mutually relatively collapse and extend said drive and driven pulley means thereby to loosen and tighten said belt means.

References Cited by the Examiner

UNITED STATES PATENTS

| | | | |
|---|---|---|---|
| 2,324,416 | 7/43 | Murray | 90—17 |
| 2,349,004 | 5/44 | Richards | 90—17 |

FOREIGN PATENTS

| | | |
|---|---|---|
| 85,646 | 3/96 | Germany. |
| 277,394 | 12/51 | Switzerland. |

WILLIAM W. DYER, Jr., *Primary Examiner.*